US010229700B2

(12) United States Patent
Sainath et al.

(10) Patent No.: US 10,229,700 B2
(45) Date of Patent: Mar. 12, 2019

(54) VOICE ACTIVITY DETECTION

(71) Applicant: GOOGLE LLC, Mountain View, CA (US)

(72) Inventors: Tara N. Sainath, Jersey City, NJ (US); Gabor Simko, Santa Clara, CA (US); Maria Carolina Parada San Martin, Boulder, CO (US); Ruben Zazo Candil, Alcobendas (ES)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/986,985

(22) Filed: Jan. 4, 2016

(65) Prior Publication Data

US 2017/0092297 A1 Mar. 30, 2017

Related U.S. Application Data

(60) Provisional application No. 62/222,886, filed on Sep. 24, 2015.

(51) Int. Cl.
*G10L 15/16* (2006.01)
*G10L 25/30* (2013.01)
*G10L 25/78* (2013.01)

(52) U.S. Cl.
CPC .............. *G10L 25/78* (2013.01); *G10L 25/30* (2013.01)

(58) Field of Classification Search
CPC ..... G10L 25/78; G10L 25/783; G10L 25/786; G10L 25/81; G10L 25/84; G10L 25/87; G10L 25/30; G10L 25/33; G10L 25/36; G10L 25/39; G10L 25/45; G10L 25/48; G10L 17/26; G10L 21/00; G10L 21/0272; G10L 25/00; G10L 25/60
USPC ............... 704/1–10, 232–233, 235, 200, 275
See application file for complete search history.

(56) References Cited

U.S. PATENT DOCUMENTS

| | | | | |
|---|---|---|---|---|
| 4,802,225 | A | 1/1989 | Patterson | |
| 5,805,771 | A | 9/1998 | Muthusamy et al. | |
| 7,072,832 | B1 | 7/2006 | Su et al. | |
| 7,702,599 | B2 | 4/2010 | Widrow | |
| 8,843,369 | B1 * | 9/2014 | Sharifi | G10L 25/87 704/235 |
| 9,286,524 | B1 | 3/2016 | Mei | |

(Continued)

OTHER PUBLICATIONS

"Voice activity detection," from Wikipedia, the free encyclopedia, last modified on Jul. 23, 2015 [retrieved on Oct. 21, 2015]. Retrieved from the Internet: URL<http://en.wikipedia.org/wiki/Voice_activity_detection>, 5 pages.

(Continued)

*Primary Examiner* — Vincent Rudolph
*Assistant Examiner* — Stephen Brinich
(74) *Attorney, Agent, or Firm* — Fish & Richardson P.C.

(57) ABSTRACT

Methods, systems, and apparatus, including computer programs encoded on a computer storage medium, for detecting voice activity. In one aspect, a method include actions of receiving, by a neural network included in an automated voice activity detection system, a raw audio waveform, processing, by the neural network, the raw audio waveform to determine whether the audio waveform includes speech, and provide, by the neural network, a classification of the raw audio waveform indicating whether the raw audio waveform includes speech.

24 Claims, 3 Drawing Sheets

(56) References Cited

U.S. PATENT DOCUMENTS

| | | | | |
|---|---|---|---|---|
| 2005/0049855 | A1* | 3/2005 | Chong-White | G10L 19/173 704/219 |
| 2009/0012638 | A1 | 1/2009 | Lou | |
| 2010/0057453 | A1* | 3/2010 | Valsan | G10L 25/78 704/232 |
| 2012/0065976 | A1 | 3/2012 | Deng | |
| 2012/0275690 | A1 | 11/2012 | Melvin | |
| 2015/0058004 | A1* | 2/2015 | Dimitriadis | G10L 25/78 704/233 |
| 2015/0066496 | A1 | 3/2015 | Deoras | |
| 2015/0095027 | A1* | 4/2015 | Parada San Martin | G10L 15/02 704/232 |
| 2015/0161995 | A1 | 6/2015 | Sainath | |
| 2015/0340034 | A1* | 11/2015 | Schalkwyk | G10L 15/18 704/235 |

OTHER PUBLICATIONS

Allen and Berkley, "Image method for efficiently simulating small-room acoustics," J. Acoust. Soc. Am. 65(4):943-950, Apr. 1979.
Benesty et al., "Microphone Array Signal Processing," Springer Topics in Signal Processing, 2008, 193 pages.
Brandstein and Ward, "Microphone Arrays: Signal Processing Techniques and Applications," Digital Signal Processing, 2001, 258 pages.
Burlick et al., "An Augmented Multi-Tiered Classifier for Instantaneous Multi-Modal Voice Activity Detection," Interspeech 2013, 5 pages, Aug. 2013.
Chuangsuwanich and Glass, "Robust Voice Activity Detector for Real World Applications Using Harmonicity and Modulation frequency," Interspeech, pp. 2645-2648, Aug. 2011.
Dean et al., "Large Scale Distributed Deep Networks," Advances in Neural Information Processing Systems 25, pp. 1232-1240, 2012.
Delcroix et al., "Linear Prediction-Based Derevetheration With Advanced Speech Enhancement and Recognition Technologies for the Reverb Challenge," Reverb Workshop 2014, pp. 1-8, 2014.
Ferroni et al., "Neural Networks Based Methods for Voice Activity Detection in a Multi-room Domestic Environment," Proc. of Evalita as part of XIII AI*IA Symposium on Artificial Intelligence, vol. 2, pp. 153-158, 2014.
Ghosh et al., "Robust Voice Activity Detection Using Long-Term Signal Variability," IEEE Transactions on Audio, Speech, and Language Processing, 19(3):600-613, Mar. 2011.
Giri et al., "Improving Speech Recognition in Reverberation Using a Room-Aware Deep Neural Network and Multi-Task Learning," 2015 IEEE International Conference on Acoustics, Speech and Signal Processing (ICASSP), pp. 5014-5018, Apr. 2015.
Glorot and Bengio, "Understanding the difficulty of training deep feedforward neural networks," Proceedings of the International Conference on Artificial Intelligence and Statistics (AISTATS'10), pp. 249-256, 2010.
Graves et al., "Speech Recognition With Deep Recurrent Neural Networks," Acoustics, Speech and Signal Processing (ICASSP), 2013 IEEE International Conference on, pp. 6645-6649, 2013.
Hain et al., "Transcribing Meetings With the AMIDA Systems," IEEE Transactions on Audio, Speech, and Language Processing, 20(2):486-498, Feb. 2012.
Heigold et al., "Asynchronous Stochastic Optimization for Sequence Training of Deep Neural Networks," 2014 IEEE International Conference on Acoustic, Speech and Signal Processing, pp. 5624-5628, 2014.
Hinton et al., "Deep Neural Networks for Acoustic Modeling in Speech Recognition," Signal Processing Magazine, IEEE, 29(6):82-97, Apr. 2012.
Hoshen et al., "Speech Acoustic Modeling From Raw Multichannel Waveforms," International Conference on Acoustics, Speech, and Signal Processing, pp. 4624-4628, Apr. 2015.
Hughes and Mierle, "Recurrent Neural Networks for Voice Activity Detection," Acoustics, Speech and Signal Processing (ICASSP), 2013 IEEE International Conference on, pp. 7378-7382, May 2013.
Kello and Plaut, "A neural network model of the articulatory-acoustic forward mapping trained on recordings of articulatory parameters," J. Acoust. Soc. Am. 116 (4), Pt. 1, pp. 2354-2364, Oct. 2004.
Maas et al., "Recurrent Neural Networks for Noise Reduction in Robust ASR," Interspeech 2012, 4 pages, 2012.
Misra, "Speech/Nonspeech Segmentation in Web Videos," Proceedings of Interspeech 2012, 4 pages, 2012.
Narayanan and Wang, "Ideal Ratio Mask Estimation Using Deep Neural Networks for Robust Speech Recognition," Acoustics, Speech and Signal Processing (ICASSP), 2013 IEEE International Conference on, pp. 7092-7096, May 2013.
Sainath et al., "Convolutional, Long Short-Term Memory, Fully Connected Deep Neural Networks," Acoustics, Speech and Signal Processing (ICASSP), 2015 IEEE International Conference on, pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, 2013.
Sainath et al., "Improvements to Deep Convolutional Neural Networks for LVCSR," In Automatic Speech Recognition and Understanding (ASRU), 2013 IEEE Workshop on, pp. 315-320, 2013.
Sainath et al., "Learning the Speech Front-end With Raw Waveform CLDNNs," Proc. Interspeech 2015, 5 pages.
Sak et al., "Long Short-Term Memory Based Recurrent Neural Network Architectures for Large Vocabulary Speech Recognition," arXiv:1402.1128v1 [cs.NE], Feb. 2014, 5 pages.
Seltzer et al., "Likelihood-Mazimizing Beamforming for Robust Hands-Five Speech Recognition," IEEE Transactions on Speech and Audio Processing, 12(5):489-498, Sep. 2004.
Stolcke et al., "The SRI-ICSI Spring 2007 Meeting and Lecture Recognition System," Proc. NIST Rich Transcription Workshop, Springer Lecture Notes in Computer Science, 14 pages, 2007.
Thomas et al., "Improvements to the IBM Speech Activity Detection System for the DARPA RATS Program," Proceedings of IEEE International Conference on Audio, Speech and Signal Processing (ICASSP), pp. 4500-4504, Apr. 2015.
Van Veen and Buckley, "Beamforming: A Versatile Approach to Spatial Filtering," ASSP Magazine, IEEE, 5(2):4-24, Apr. 1988.
Weiss and Kristjansson, "DySANA: Dynamic Speech and Noise Adaptation for Voice Activity Detection," Proc. of Interspeech 2008, pp. 127-130, 2008.
Yu et al., "Feature Learning in Deep Neural Networks—Studies on Speech Recognition Tasks," arXiv:1301.3605v3 [cs.LG], pp. 1-9, Mar. 2013.
Zelinski, "A Microphone Array With Adaptive Post-Filtering for Noise Reduction in Reverberant Rooms," Acoustics, Speech, and Signal Processing, 1988. ICASSP-88., 1988 International Conference on, vol. 5, pp. 2578-2581, Apr. 1988.
Zhang and Wang, "Boosted Deep Neural Networks and Multi-resolution Cochleagram Features for Voice Activity Detection," Interspeech 2014, pp. 1534-1538, Sep. 2014.
Eyben et al., "Real-life voice activity detection with LSTM Recurrent Neural Networks and an application to Hollywood movies," 2013 IEEE International Conference on Acoustics, Speech and Signal Processing (ICASSP); May 2013, Institute of Electrical and Electronics Engineers, May 26, 2013, pp. 483-487, XP032509188.
International Search Report and Written Opinion in International Application No. PCT/US2016/043552, dated Sep. 23, 2016, 12 pages.
Thomas et al., "Analyzing convolutional neural networks for speech activity detection in mismatched acoustic conditions," 2014 IEEE International Conference on Acoustics, Speech and Signal Processing (ICASSP), IEEE, May 4, 2014, pp. 2519-2523, XP032617994.
International Preliminary Report on Patentability issued in International Application No. PCT/US2016/043552, dated Apr. 5, 2018, 8 pages.
Abdel-Hamid et al. "Applying convolutional neural networks concepts to hybrid NN-HMM model for speech recognition.", IEEE

(56) References Cited

OTHER PUBLICATIONS

International Conference on Acoustics, Speech and Signal Processing (ICASSP), Mar. 2012, 4 pages.
Ganapathy et al, "Robust language identification using convolutional neural network features", Fifteenth Annual Conference of the International Speech Communication Association, Mar. 2014, 5 pages.
Huang et al, "An analysis of convolutional neural networks for speech recognition.", IEEE International Conference on Acoustics, Speech and Signal Processing (ICASSP) Aug. 6 2015, 5 pages.
Palaz et al, "Estimating phoneme class conditional probabilities from raw speech signal using convolutional neural networks." arXiv preprint arXiv: 1304.1018v2, Jun. 12, 2013, 5 pages.
Renals et al, "Neural networks for distant speech recognition.", 4th Joint Workshop on Hands-free Speech Communication and Microphone Arrays (HSCMA), May 2014, 5 pages.
Sainath, et al. "Improvements to deep neural networks for large vocabulary continuous speech recognition tasks.", IBM TJ Watson Research Center, Jan. 2014, 57 pages.
Swietojanski et al, "Convolutional Neural Networks for Distant Speech Recognition," IEEE Signal Processing Letters, vol. 21, No. 9, May 2014, 5 pages.
Mohamed, "Deep neural network acoustic models for asr." Year 2014, pp. 1-120.
Nakatani et al. "Investigation of Deep Neural Network and Cross-Adaptation for Voice Activity Detection in Meeting Speech," Technical Research Report of the Institute of Electronics, Information and communication Engineers, Japan, Dec. 2014,6 pages (English Abstract).
Office Action issued in Japanese Application No. 2017-556929, dated Jul. 13, 2018, 3 pages (English translation).
Zeng et al., "Convolutional Neural Networks for human activity recognition using mobile sensors," International Conference on Mobile Computing, Applications and Services, Austin, TX, Dated Nov. 6, 2014, pp. 197-205.
Isogai et al. "Dynamic Programming—Automatic Endpoint Detection for Neural Network Speech Recognition," Paper of the Japan Acoustical Society Research Presentation Conference, Spring Mar. 1, 1990, (English Abstract).
Japanese Office Action issued in Japanese Application No. 2017-556929, dated Dec. 3, 2018, 6 pages (with English translation).
Palaz et al. "Convolutional Neural Networks Based Continuous Speech Recognition," ICASSP, Apr. 24, 2015, 5 pages.
Taiwanese office Action issued in Taiwanese Application No. 10-2017-7031606, dated Jan. 17, 2019, 12 pages (with English Translation).

* cited by examiner

VOICE ACTIVITY DETECTION

CROSS-REFERENCE TO RELATED APPLICATIONS

This application claims the benefit of U.S. Provisional Application No. 62/222,886, filed on Sep. 24, 2015, the contents of which are incorporated herein by reference.

TECHNICAL FIELD

This disclosure generally relates to voice activity detection.

BACKGROUND

Speech recognition systems may use voice activity detection to determine when to perform speech recognition. For example, the speech recognition system may detect voice activity in audio input and, in response, may determine to generate a transcription from the audio input.

SUMMARY

In general, an aspect of the subject matter described in this specification may involve a process for detecting voice activity. The process may include training a neural network to detect voice activity by providing audio waveforms labeled as either including voice activity or not including voice activity to the neural network. The trained neural network is then provided input audio waveforms and classifies the input audio waveforms as including voice activity or not including voice activity.

In some aspects, the subject matter described in this specification may be embodied in methods that may include the actions of obtaining an audio waveform, providing the audio waveform to a neural network, and obtaining, from the neural network, a classification of the audio waveform as including speech.

Other versions include corresponding systems, apparatus, and computer programs, configured to perform the actions of the methods, encoded on computer storage devices.

These and other versions may each optionally include one or more of the following features. For instance, in some implementations the audio waveform includes a raw signal spanning multiple samples each of a predetermined time length. In certain aspects, the neural network is a convolutional, long short-term memory, fully connected deep neural network. In some aspects, the neural network includes a time convolution layer with multiple filters, each spanning a predetermined length of time, wherein the filters convolve against the audio waveform. In some implementations, the neural network includes a frequency convolution layer that convolves the output of the time convolution layer based on frequency. In certain aspects, the neural network includes one or more long-short-term memory network layers. In some aspects, the neural network includes one or more deep neural network layers. In some implementations, actions include training the neural network to detect voice activity by providing the neural network audio waveforms labeled as either including voice activity or not including voice activity.

In general, one innovative aspect of the subject matter described in this specification can be embodied in methods that include the actions of receiving, by a neural network included in an automated voice activity detection system, a raw audio waveform, processing, by the neural network, the raw audio waveform to determine whether the audio waveform includes speech, and provide, by the neural network, a classification of the raw audio waveform indicating whether the raw audio waveform includes speech. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Providing, by an automated voice activity detection system, the raw audio waveform to the neural network included in the automated voice activity detection system may include providing, to the neural network, a raw signal spanning multiple samples each of a predetermined time length. Providing, by the automated voice activity detection system, the raw audio waveform to the neural network may include providing, by the automated voice activity detection system, the raw audio waveform to a convolutional, long short-term memory, fully connected deep neural network (CLDNN).

In some implementations, processing, by the neural network, the raw audio waveform to determine whether the audio waveform includes speech may include processing, by a time convolution layer in the neural network, the raw audio waveform to generate a time-frequency representation using multiple filters that each span a predetermined length of time. Processing, by the neural network, the raw audio waveform to determine whether the audio waveform includes speech may include processing, by a frequency convolution layer in the neural network, the time-frequency representation based on frequency. The time-frequency representation may include a frequency axis. Processing, by the frequency convolution layer in the neural network, the time-frequency representation based on frequency may include max pooling, by the frequency convolution layer, the time-frequency representation along the frequency axis using non-overlapping pools.

Processing, by the neural network, the raw audio waveform to determine whether the audio waveform includes speech may include processing, by one or more long-short-term memory network layers in the neural network, data generated from the raw audio waveform. Processing, by the neural network, the raw audio waveform to determine whether the audio waveform includes speech may include processing, by one or more deep neural network layers in the neural network, data generated from the raw audio waveform. The method may include training the neural network to detect voice activity by providing the neural network with audio waveforms labeled as either including voice activity or not including voice activity. Providing, by the neural network, the classification of the raw audio waveform indicating whether the raw audio waveform includes speech may include providing, by the neural network to an automated speech recognition system that includes the automated voice activity detection system, the classification of the raw audio waveform indicating whether the raw audio waveform includes speech.

The subject matter described in this specification can be implemented in particular embodiments and may result in one or more of the following advantages. In some implementations, the systems and methods described below may model a temporal structure of a raw audio waveform. In some implementations, the systems and methods described below may have improved performance in noisy conditions, clean conditions, or both, compared to other systems.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Voice Activity Detection (VAD) refers to a process of identifying segments of speech in an audio waveform. VAD is sometimes a preprocessing stage of an automatic speech recognition (ASR) system to both reduce computation and to guide the ASR system as to what portions of an audio waveform in which speech should be analyzed.

A VAD system may use multiple different neural network architectures to determine whether an audio waveform includes speech. For instance, a neural network may use a Deep Neural Network (DNN) to create a model for VAD or map features into a more separable space or both, may use a Convolutional Neural Network (CNN) to reduce or model frequency variations, may use a Long-Short-Term memory (LSTM) to model sequences or temporal variations, or two or more of these. In some examples, a VAD system may combine DNNs, CNNs, LSTMs, each of which may be a particular layer type in the VAD system, or a combination of two or more of these, to obtain better performance than any of these neural network architectures individually. For instance, a VAD system may use a Convolutional, Long Short-Term Memory, Fully Connected Deep Neural Network (CLDNN), which is a combination of a DNN, a CNN, and a LSTM, to model a temporal structure, e.g., as part of a sequence task, to combine the benefits of the individual layers, or both.

Figure 1:
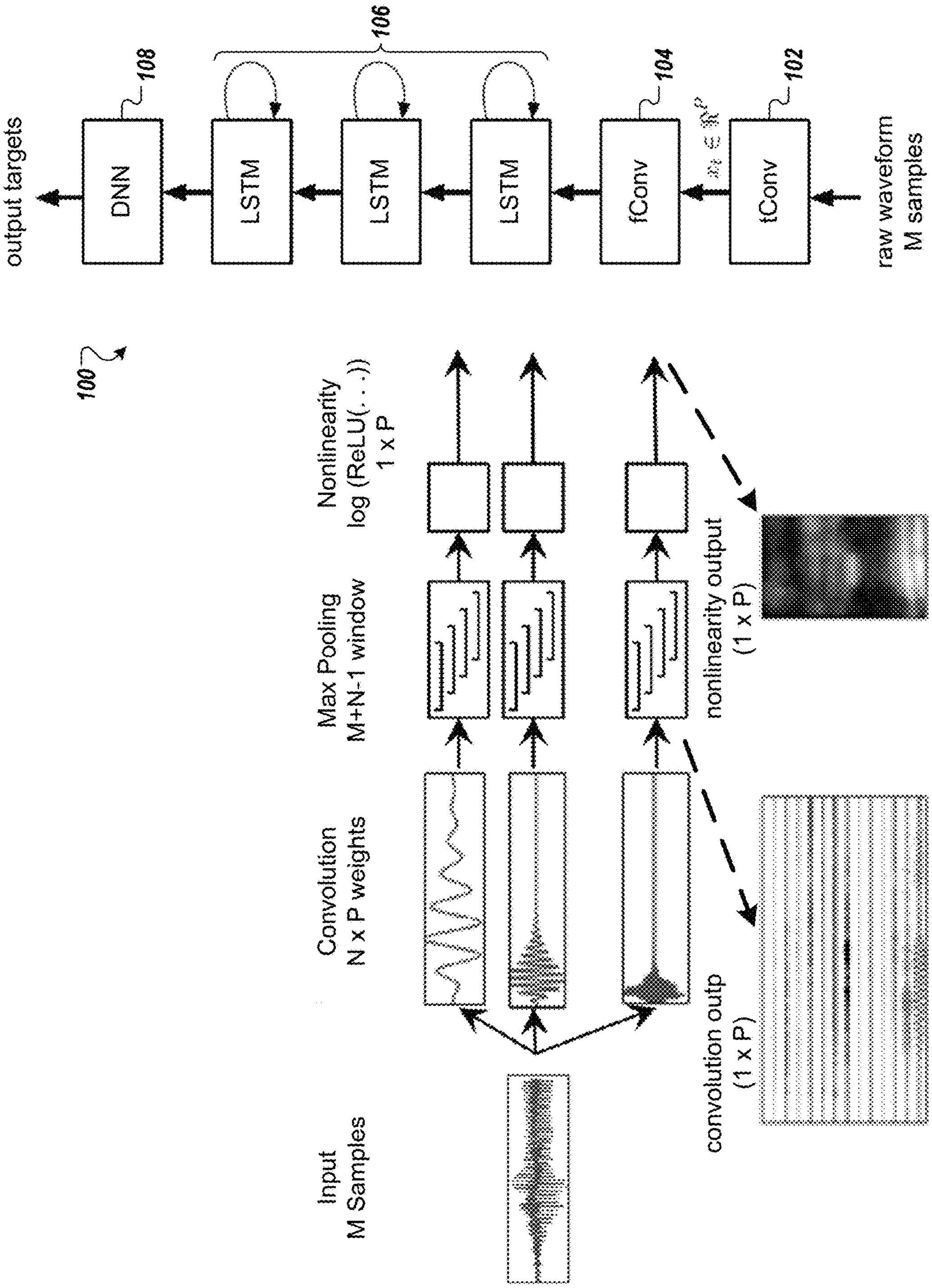
FIG. 1 is an illustration of a block diagram of an example architecture of a neural network for voice activity detection.

FIG. 1 is a block diagram of an example architecture of a neural network 100 for voice activity detection. The neural network 100 may be included in or otherwise part of an automated voice activity detection system.

The neural network includes a first convolution layer 102 that generates a time-frequency representation of a raw audio waveform. The first convolution layer 102 may be a time convolution layer. The raw audio waveform may be a raw signal spanning roughly M samples. In some examples, a duration of each of the M samples may be thirty-five milliseconds.

The first convolution layer 102 may be a convolution layer with P filters with each filter spanning a length of N. For instance, the neural network 100 may convolve the first convolution layer 102 against the raw audio waveform to generate a convolved output. The first convolution layer 102 may include between forty to one hundred twenty-eight filters P. Each of the P filters may span a length N of twenty-five milliseconds.

The first convolution layer 102 may pool the convolved output over the entire length of the convolution (M−N+1) to create a pooled output. The first convolution layer 102 may apply a rectified nonlinearity to the pooled output, followed by a stabilized logarithm compression, to produce a P-dimensional time-frequency representation $X_t$.

The first convolution layer 102 provides the P-dimensional time-frequency representation $x_t$ to a second convolution layer 104 included in the neural network 100. The second convolution layer 104 may be a frequency convolution layer. The second convolution layer 104 may have filters of size 1×8 in time×frequency. The second convolution layer 104 may use non-overlapping max pooling along the frequency axis of the P-dimensional time-frequency representation xt. In some examples, the second convolution layer 104 may use a pooling size of three. The second convolution layer 104 generates a second representation as output.

The neural network 100 provides the second representation to a first of one or more LSTM layers 106. In some examples, an architecture of the LSTM layers 106 is unidirectional with k hidden layers and n hidden units per layer. In some implementations, the LSTM architecture does not include a projection layer, e.g., between the second convolution layer 104 and the first hidden LSTM layer. The LSTM layers 106 generate a third representation as output, e.g., by passing the output of the first LSTM layer to a second LSTM layer for processing and so forth.

The neural network 100 provides the third representation to one or more DNN layers 108. The DNN layers may be feed-forward fully connected layers with k hidden layers and n hidden units per layer. The DNN layers 108 may use a rectified linear unit (ReLU) function for each hidden layer. The DNN layers 108 may use a softmax function with two units to predict speech and non-speech in the raw audio waveform. For example, the DNN layers 108 may output a value, e.g., a binary value, that indicates whether the raw audio waveform included speech. The output may be for a portion of the raw audio waveform or for the entire raw audio waveform. In some examples, the DNN layers 108 include only a single DNN layer.

Table 1 below describes three example implementations, A, B, and C, of the neural network 100. For instance, Table 1 lists the properties of the layers included in a CLDNN that accepts a raw audio waveform as input and outputs a value that indicates whether the raw audio waveform encodes speech, e.g., an utterance.

TABLE 1

| | Implementation A | Implementation B | Implementation C |
|---|---|---|---|
| Time convolution layer | | | |
| # filter outputs | 40 | 84 | 128 |
| Filter size: 1 × 25 ms | 1 × 401 | 1 × 401 | 1 × 401 |
| Pooling size: 1 × 10 ms | 1 × 161 | 1 × 161 | 1 × 161 |
| Frequency convolution layer | | | |
| # filter outputs | 32 | 64 | 64 |
| Filter size (frequency × time) | 8 × 1 | 8 × 1 | 8 × 1 |
| Pooling size (frequency × time) | 3 × 1 | 3 × 1 | 3 × 1 |

TABLE 1-continued

| | Implementation A | Implementation B | Implementation C |
|---|---|---|---|
| LSTM layers | | | |
| # of hidden layers | 1 | 2 | 3 |
| # of hidden units per layer | 32 | 64 | 80 |
| DNN layer | | | |
| # of hidden units | 32 | 64 | 80 |
| Total number of parameters | 37,570 | 131,642 | 218,498 |

In some implementations, the neural network 100, e.g., the CLDNN neural network, may be trained using the asynchronous stochastic gradient descent (ASGD) optimization strategy with the cross-entropy criterion. The neural network 100 may initialize the CNN layers 102 and 104 and the DNN layers 108 using the Glorot-Bengio strategy. The neural network 100 may initialize the LSTM layers 106 to randomly be values between −0.02 and 0.02. The neural network 100 may initialize the LSTM layers 106 uniform randomly.

The neural network 100 may exponentially decay the learning rates. The neural network 100 may independently chose the learning rates for each model, e.g., each of the different types of layers, each of the different layers, or both. The neural network 100 may chose each of the learning rates to be the largest value such that training remains stable, e.g., for the respective layer. In some examples, the neural network 100 trains the time convolution layer, e.g., the first convolution layer 102, and the other layers in the neural network 100 jointly.

Figure 2:
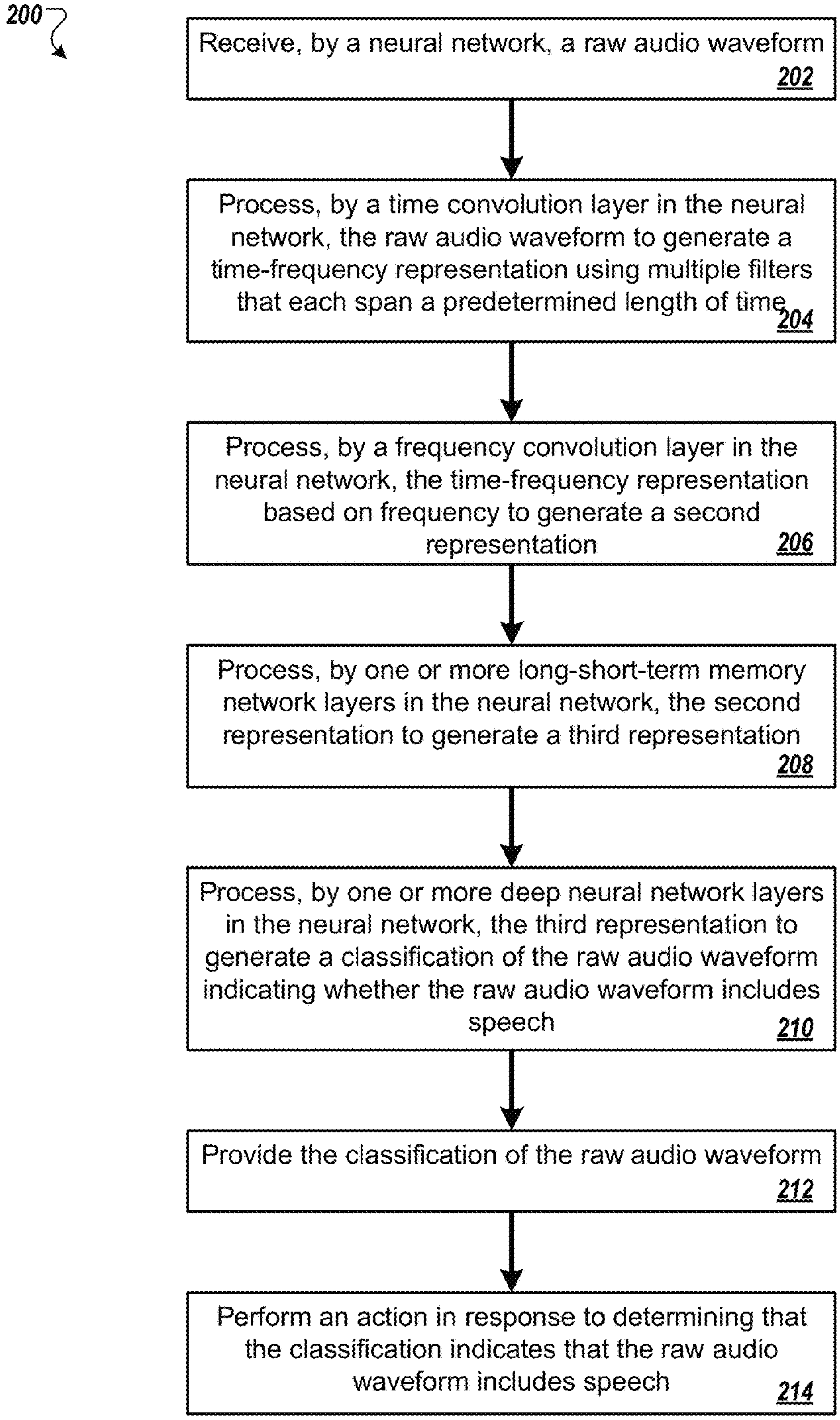
FIG. 2 is a flow diagram of a process for providing a classification of a raw audio waveform.

FIG. 2 is a flow diagram of a process 200 for providing a classification of a raw audio waveform. For example, the process 200 can be used by the neural network 100.

The neural network receives a raw audio waveform (202). For example, the neural network may be included on a user device and may receive the raw audio waveform from a microphone. The neural network may be part of a voice activity detection system.

A time convolution layer in the neural network processes the raw audio waveform to generate a time-frequency representation using multiple filters that each span a predetermined length of time (204). For instance, the time convolution layer may include between forty and one hundred twenty-eight filters that each span a length of N milliseconds. The time convolution layer may use the filters to process the raw audio waveform and generate the time-frequency representation.

A frequency convolution layer in the neural network processes the time-frequency representation based on frequency to generate a second representation (206). For instance, the frequency convolution layer may use max pooling with non-overlapping pools to process the time-frequency representation and generate the second representation.

One or more long-short-term memory network layers in the neural network process the second representation to generate a third representation (208). For example, the neural network may include three long-short-term memory (LSTM) network layers that process, in sequence, the third representation. In some examples, the LSTM layers may include two LSTM layers that process, in succession, the second representation to generate the third representation. Each of the LSTM layers includes multiple units, each of which may remember data from processing other segments of the raw audio waveform. For instance, each LSTM unit may include a memory that tracks previous outputs from that unit for the processing of other segments of the raw audio waveform. The memories in the LSTM may be reset for processing of a new raw audio waveform.

One or more deep neural network layers in the neural network process the third representation to generate a classification of the raw audio waveform indicating whether the raw audio waveform includes speech (210). In some examples, a single deep neural network layer, with between thirty-two and eighty hidden units, processes the third representation to generate the classification. For instance, each DNN layer may process a portion of the third representation and generate an output. The DNN may include an output later that combines output values from hidden DNN layers The neural network provides the classification of the raw audio waveform (212). The neural network may provide the classification to the voice activity detection system. In some examples, the neural network or the voice activity detection system provide the classification, or a message representing the classification, to the user device.

A system performs an action in response to determining that the classification indicates that the raw audio waveform includes speech (214). For instance, the neural network causes the system to perform the action by providing the classification that indicates that the raw audio waveform includes speech. In some implementations, the neural network causes a speech recognition system, e.g., an automated speech recognition system that includes the voice activity detection system, to analyze the raw audio waveform to determine an utterance encoded in the raw audio waveform.

In some implementations, the process 200 can include additional steps, fewer steps, or some of the steps can be divided into multiple steps. For example, the voice activity detection system may train the neural network, e.g., using ASGD, prior to receipt of the raw audio waveform by the neural network or as part of a process that includes receipt of a raw audio waveform that is part of a training dataset. In some examples, the process 200 may include one or more of steps 202 through 212 without step 214.

Figure 3:
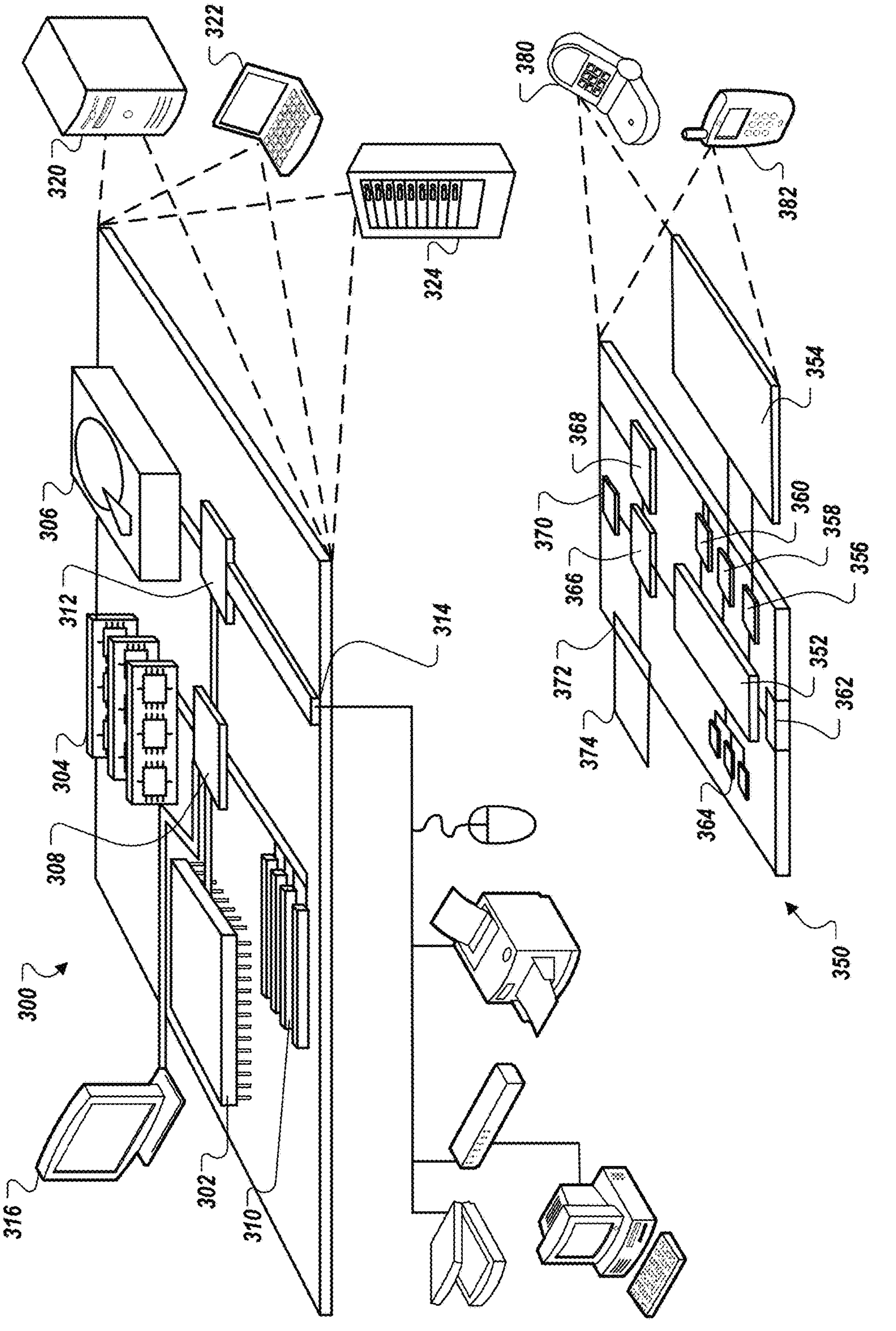
FIG. 3 is a diagram of exemplary computing devices.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:

receiving, by a neural network included in an automated voice activity detection system, a raw audio waveform, wherein when the voice activity detection system determines that a particular raw audio waveform likely encodes an utterance, the voice activity detection system sends a signal to an automated speech recognition system to cause the automated speech recognition system to determine the utterance encoded in the particular raw audio waveform;

processing, by the neural network, the raw audio waveform to determine a classification that indicates whether the audio waveform includes speech by:

processing, by one or more long-short-term memory network layers in the neural network, data generated from the raw audio waveform;

in response to processing the raw audio waveform, determining, by the automated voice activity detection system, whether the classification indicates that the raw audio waveform likely encodes an utterance and the automated voice activity detection system should send a signal to the automated speech recognition system to cause the automated speech recognition system to determine an utterance encoded in the raw audio waveform; and in response to determining that the classification indicates that the raw audio waveform likely does not encode an utterance, determining, by the automated voice activity detection system, to skip sending the signal to the automated speech recognition system.

2. The method of claim 1, wherein receiving, by the neural network included in the automated voice activity detection system, the raw audio waveform comprises:

receiving, by the neural network, a raw signal spanning multiple samples each of a predetermined time length.

3. The method of claim 1, wherein processing, by the neural network, the raw audio waveform to determine the classification that indicates whether the audio waveform includes speech comprises:

processing, by a time convolution layer in the neural network, the raw audio waveform to generate a time-frequency representation using multiple filters that each span a predetermined length of time.

4. The method of claim 3, wherein processing, by the neural network, the raw audio waveform to determine the classification that indicates whether the audio waveform includes speech comprises:

processing, by a frequency convolution layer in the neural network, the time-frequency representation based on frequency.

5. The method of claim 4, wherein:

the time-frequency representation includes a frequency axis; and processing, by the frequency convolution layer in the neural network, the time-frequency representation based on frequency comprises max pooling, by the frequency convolution layer, the time-frequency representation along the frequency axis using non-overlapping pools.

6. The method of claim 1, wherein processing, by the neural network, the raw audio waveform to determine the classification that indicates whether the audio waveform includes speech comprises:

processing, by one or more deep neural network layers in the neural network, second data generated from the raw audio waveform.

7. The method of claim 1, comprising:

training the neural network to detect voice activity by providing the neural network with audio waveforms labeled as either including voice activity or not including voice activity.

8. The method of claim 1, wherein determining whether the classification indicates that the raw audio waveform likely encodes an utterance and the automated voice activity detection system should send a signal to the automated speech recognition system comprises determining whether to send the signal to an automated speech recognition system that includes the automated voice activity detection system.

9. The method of claim 6, wherein processing, by the one or more deep neural network layers in the neural network, the second data generated from the raw audio waveform comprises processing, by the one or more deep neural network layers in the neural network, the second data generated by the one or more long-short-term memory network layers in the neural network.

10. The method of claim 1, comprising:

determining, by the automated voice activity detection system for a second raw audio waveform different from the raw audio waveform, whether a second classification indicates that the second raw audio waveform likely encodes an utterance and to send a signal to the automated speech recognition system to cause the automated speech recognition system to determine an utterance encoded in the raw audio waveform; and in response to determining that the classification indicates that the raw audio waveform likely encodes an utterance, sending the signal to the automated speech recognition system.

11. A computer-implemented method comprising:

receiving, by a convolutional, long short-term memory, fully connected deep neural network (CLDNN) included in an automated voice activity detection system, a raw audio waveform, wherein when the voice activity detection system determines that a particular raw audio waveform likely encodes an utterance, the voice activity detection system sends a signal to an automated speech recognition system to cause the automated speech recognition system to determine the utterance encoded in the particular raw audio waveform;

processing, by the CLDNN, the raw audio waveform to determine a classification that indicates whether the audio waveform includes speech;

in response to processing the raw audio waveform, determining, by the automated voice activity detection system, whether the classification indicates that the raw audio waveform likely encodes an utterance and the automated voice activity detection system should send a signal to the automated speech recognition system to cause the automated speech recognition system to determine an utterance encoded in the raw audio waveform; and in response to determining that the classification indicates that the raw audio waveform likely does not encode an utterance, determining, by the automated voice activity detection system, to skip sending the signal to the automated speech recognition system.

12. An automated voice activity detection system comprising:

one or more computers; and one or more storage devices storing instructions that are operable, when executed by the one or more computers, to cause the one or more computers to perform operations comprising:

receiving, by a neural network included in the automated voice activity detection system, a raw audio waveform, wherein when the voice activity detection system determines that a particular raw audio waveform likely encodes an utterance, the voice activity detection system sends a signal to an automated speech recognition system to cause the automated speech recognition system to determine the utterance encoded in the particular raw audio waveform;

processing, by the neural network, the raw audio waveform to determine a classification that indicates whether the audio waveform includes speech by:

processing, by one or more long-short-term memory network layers in the neural network, data generated from the raw audio waveform;

in response to processing the raw audio waveform, determining, by the automated voice activity detection system, whether the classification indicates that the raw audio waveform likely encodes an utterance and the automated voice activity detection system should send a signal to the automated speech recognition system to cause the automated speech recognition system to determine an utterance encoded in the raw audio waveform; and in response to determining that the classification indicates that the raw audio waveform likely does not encode an utterance, determining, by the automated voice activity detection system, to skip sending the signal to the automated speech recognition system.

13. The system of claim 12, wherein receiving, by the neural network included in the automated voice activity detection system, the raw audio waveform comprises:

receiving, by the neural network, a raw signal spanning multiple samples each of a predetermined time length.

14. The system of claim 12, wherein:

the neural network comprises a time convolution layer with multiple filters, each spanning a predetermined length of time; and processing, by the neural network, the raw audio waveform to determine the classification that indicates whether the audio waveform includes speech comprises processing, by the time convolution layer, the raw audio waveform to generate a time-frequency representation using the multiple filters.

15. The system of claim 14, wherein:

the neural network comprises a frequency convolution layer; and processing, by the neural network, the raw audio waveform to determine the classification that indicates whether the audio waveform includes speech comprises processing, by the frequency convolution layer, the time-frequency representation based on frequency.

16. The system of claim 12, wherein the neural network comprises:

one or more deep neural network layers to process second data generated from the raw audio waveform.

17. The system of claim 12, the operations comprising:

training the neural network to detect voice activity by providing the neural network with audio waveforms labeled as either including voice activity or not including voice activity.

18. The system of claim 15, wherein:

the time-frequency representation includes a frequency axis; and processing, by the frequency convolution layer in the neural network, the time-frequency representation based on frequency comprises max pooling, by the frequency convolution layer, the time-frequency representation along the frequency axis using non-overlapping pools.

19. The system of claim 12, wherein determining whether the classification indicates that the raw audio waveform likely encodes an utterance and the automated voice activity detection system should send a signal to the automated speech recognition system comprises determining whether to send the signal to an automated speech recognition system that includes the automated voice activity detection system.

20. The system of claim 16, wherein processing, by the one or more deep neural network layers in the neural network, the second data generated from the raw audio waveform comprises processing, by the one or more deep neural network layers in the neural network, the second data generated by the one or more long-short-term memory network layers in the neural network.

21. An automated voice activity detection system comprising:

one or more computers; and one or more storage devices storing instructions that are operable, when executed by the one or more computers, to cause the one or more computers to perform operations comprising:

receiving, by a convolutional, long short-term memory, fully connected deep neural network (CLDNN) included in the automated voice activity detection system, a raw audio waveform, wherein when the voice activity detection system determines that a particular raw audio waveform likely encodes an utterance, the voice activity detection system sends a signal to an automated speech recognition system to cause the automated speech recognition system to determine the utterance encoded in the particular raw audio waveform;

processing, by the CLDNN, the raw audio waveform to determine a classification that indicates whether the audio waveform includes speech;

in response to processing the raw audio waveform, determining, by the automated voice activity detection system, whether the classification indicates that the raw audio waveform likely encodes an utterance and the automated voice activity detection system should send a signal to the automated speech recognition system to cause the automated speech recognition system to determine an utterance encoded in the raw audio waveform; and in response to determining that the classification indicates that the raw audio waveform likely does not encode an utterance, determining, by the automated voice activity detection system, to skip sending the signal to the automated speech recognition system.

22. A non-transitory computer-readable medium storing instructions executable by one or more computers which, upon such execution, cause the one or more computers to perform operations comprising:

receiving, by a neural network included in an automated voice activity detection system, a raw audio waveform, wherein when the voice activity detection system determines that a particular raw audio waveform likely encodes an utterance, the voice activity detection system sends a signal to an automated speech recognition system to cause the automated speech recognition system to determine the utterance encoded in the particular raw audio waveform;

processing, by the neural network, the raw audio waveform to determine a classification that indicates whether the audio waveform includes speech by:

processing, by one or more long-short-term memory network layers in the neural network, data generated from the raw audio waveform;

in response to processing the raw audio waveform, determining, by the automated voice activity detection system, whether the classification indicates that the raw audio waveform likely encodes an utterance and the automated voice activity detection system should send a signal to the automated speech recognition system to cause the automated speech recognition system to determine an utterance encoded in the raw audio waveform; and in response to determining that the classification indicates that the raw audio waveform likely does not encode an utterance, determining, by the automated voice activity detection system, to skip sending the signal to the automated speech recognition system.

23. The medium of claim 22, wherein receiving, by a neural network included in the automated voice activity detection system, the raw audio waveform comprises:

receiving, by the neural network, a raw signal spanning multiple samples each of a predetermined time length.

24. A non-transitory computer-readable medium storing instructions executable by one or more computers which, upon such execution, cause the one or more computers to perform operations comprising:

receiving, by a convolutional, long short-term memory, fully connected deep neural network (CLDNN) included in an automated voice activity detection system, a raw audio waveform, wherein when the voice activity detection system determines that a particular raw audio waveform likely encodes an utterance, the voice activity detection system sends a signal to an automated speech recognition system to cause the automated speech recognition system to determine the utterance encoded in the particular raw audio waveform;

processing, by the CLDNN, the raw audio waveform to determine a classification that indicates whether the audio waveform includes speech;

in response to processing the raw audio waveform, determining, by the automated voice activity detection system, whether the classification indicates that the raw audio waveform likely encodes an utterance and the automated voice activity detection system should send a signal to the automated speech recognition system to cause the automated speech recognition system to determine an utterance encoded in the raw audio waveform; and in response to determining that the classification indicates that the raw audio waveform likely does not encode an utterance, determining, by the automated voice activity detection system, to skip sending the signal to the automated speech recognition system.

* * * * *